Oct. 6, 1953   S. B. WELCH ET AL   2,654,239
AUTOMATIC WASHING MACHINE ELECTRICAL CONTROL SYSTEM
Filed April 24, 1951   2 Sheets-Sheet 1

Inventors:
Stanley B. Welch,
Eugene G. Olthuis,
by
Their Attorney.

Inventors:
Stanley B. Welch,
Eugene G. Olthuis,
by *Sheridan...*
Their Attorney.

Patented Oct. 6, 1953

2,654,239

UNITED STATES PATENT OFFICE 2,654,239

AUTOMATIC WASHING MACHINE ELECTRICAL CONTROL SYSTEM

Stanley B. Welch, Milford, Conn., and Eugene G. Olthuis, Trenton, N. J., assignors to General Electric Company, a corporation of New York Application April 24, 1951, Serial No. 222,688

12 Claims. (Cl. 68—12)

1

This invention relates to an improved control circuit for the operation of a machine having a plurality of electrically energized mechanisms which function automatically in a predetermined time sequence. For example, the circuit may be applied to an automatic clothes washing machine in which water at preselected temperature is supplied to the machine at proper times and the machine is conducted through a series of operational cycles which may include a washing period, removal of wash water, a rinse period and a final water extraction period.

It is an object of our invention to provide an improved control circuit which will function efficiently to accomplish a desired sequence of control steps.

It is a further object of our invention to provide a sequence control circuit with a minimum number of control elements, thereby simplifying the control and its components, reducing maintenance problems, and establishing the assembly wiring and testing requirements of the circuit and its components within the capabilities of unskilled labor.

Broadly speaking, we accomplish the above noted objectives with conventional elements, such as a standard timer motor driven cam switch bank, solenoid actuated water control valves, and a fractional horsepower reversible drive motor arranged in a novel circuit predicated upon impedance relationships in which the timer motor impedance is greater than that of the water valve solenoids and the latter in turn have an impedance greater than that of the drive motor.

Figure 1:
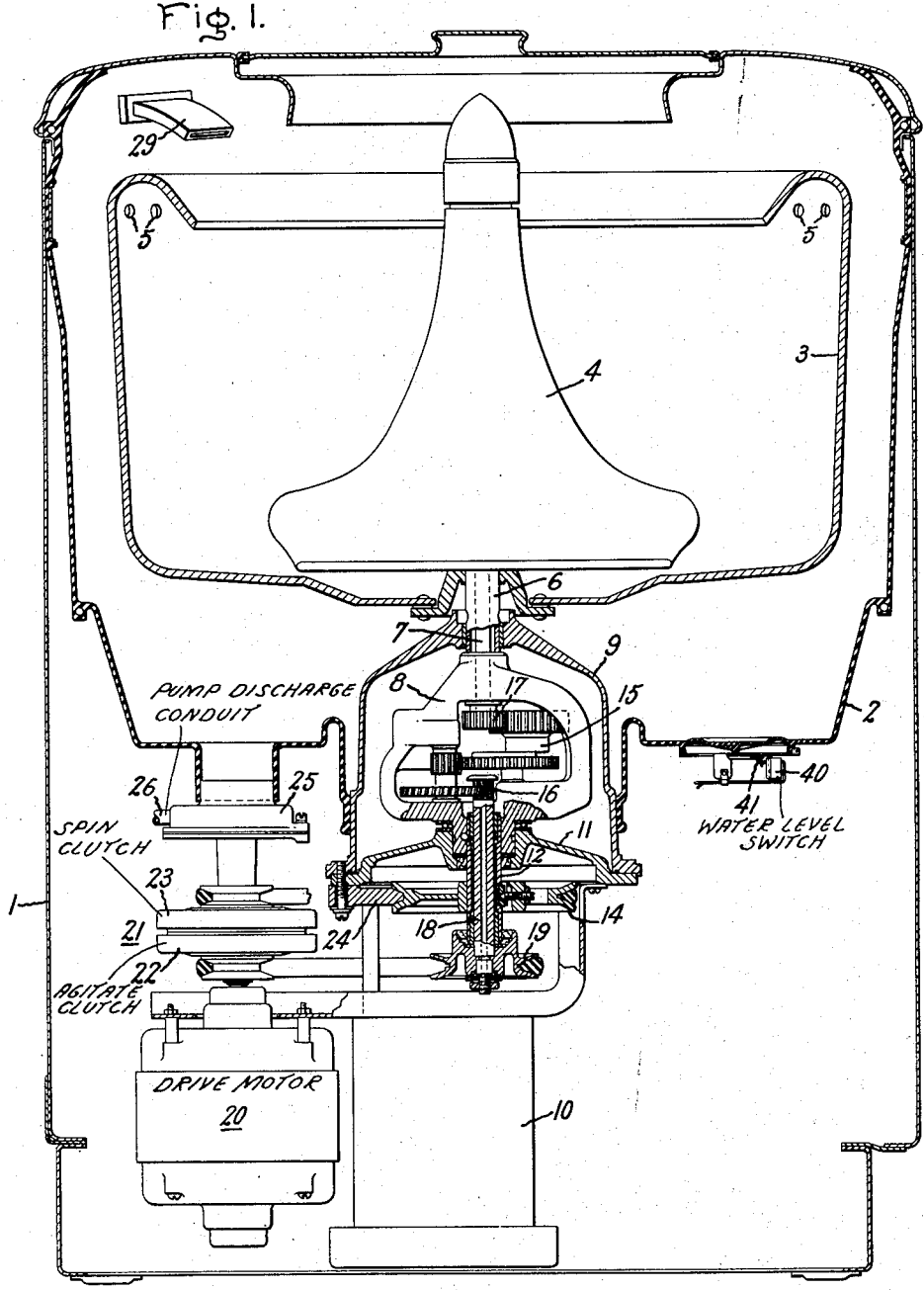
Figure 3:
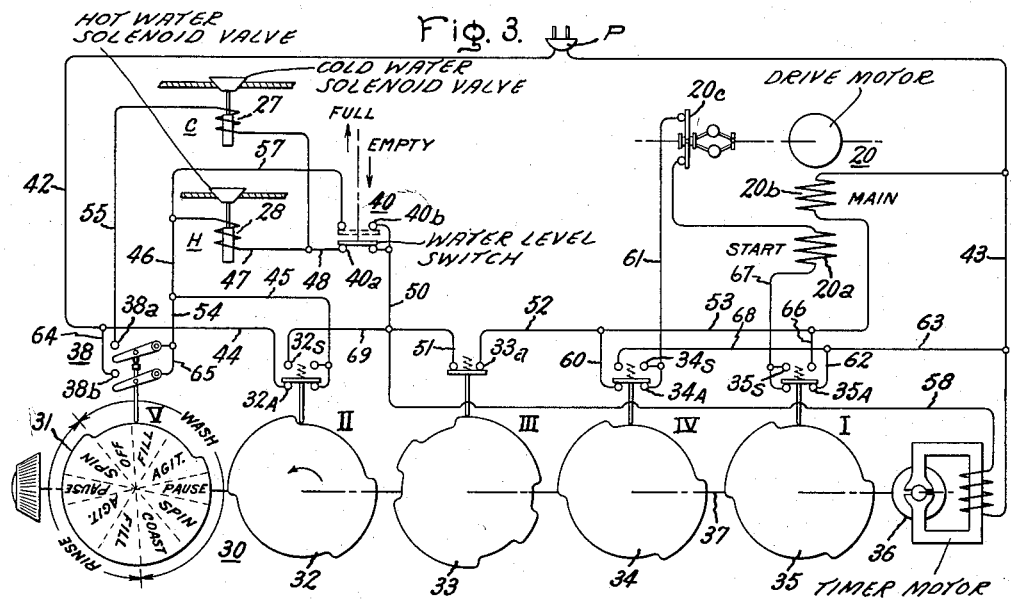
Figure 4:
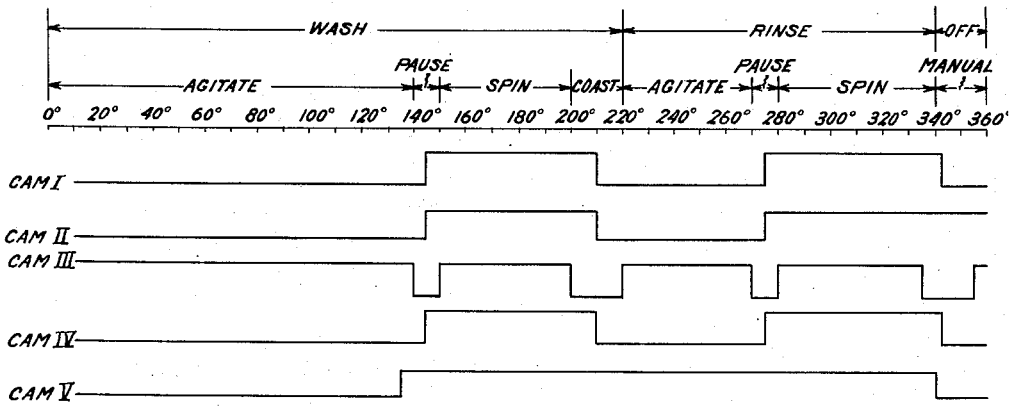
Figure 2:
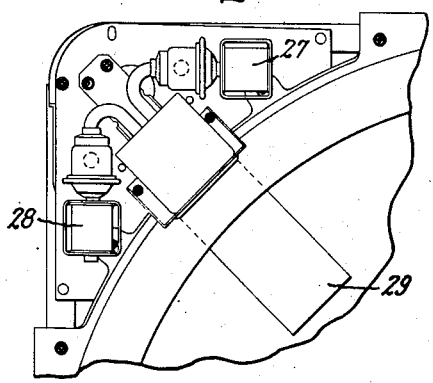

Other features and advantages of our invention will be apparent from the following detailed description read in the light of the accompanying drawings which show a presently preferred embodiment of our invention applied to a domestic washing machine. Fig 1 of said drawings is a sectional elevation of a washing machine of the centrifugal extraction type; Fig. 2 is a fragmentary sectional plan view showing an arrangement of the electrically energized hot and cold water valves; Fig. 3 is a representation of a circuit embodying our invention, the cam actuated switches for operating the same being shown schematically; and Fig. 4 is a chart showing the operation of the cam at any particular instant during the operating cycle.

Referring to Fig. 1 of the drawings, there is provided an outer casing 1 of a clothes washing machine within which is secured a suitable tub 2. While the tub 2 is shown as a resilient structure supported from the upper part of the casing

2

1, it will be understood that it may be of metal or plastic and supported in any suitable manner. Within the tub is a basket 3 in which the clothes are placed to be washed by oscillation of an agitator 4. During the washing operation, the basket is held stationary. Thereafter, the cleansing liquid is centrifugally extracted from the clothes by rotating the basket at high speed. During this extraction operation, the basket and agitator are rotated as a unit and the liquid is discharged through openings 5 at the basket's upper edge. This water is collected in and later removed from the tub 2. The basket and the agitator are respectively mounted on concentric independently rotatable shafts 6 and 7. The basket shaft 6 is attached to a gear frame 8 journaled for rotation within a casing 9 suitably carried by a stationary supporting structure 10. The gear frame is journaled in the base plate 11 of the casing and is arranged to be rotated therein by a shaft 12 concentric with shaft 6 and provided with a sheave 14. A gear train 15 includes means for translating rotation of a drive pinion 16 into oscillation of a gear 17 keyed to the shaft 7. Such mechanisms are well known; see, for example, the similar gear train in McNairy Patent 2,462,657, which is owned by the General Electric Company, assignee of the present application. Drive pinion 16 is formed on the upper end of a shaft 18 journaled within shaft 12 for rotation relative thereto; to the lower end of shaft 18 is affixed a sheave 19. Power for agitation and spin is supplied by a reversible drive motor 20 having a conventional start winding 20a, a running or main winding 20b, and a centrifugal cutout switch 20c for the start winding, as shown in Fig. 3. The motor 20 operates through directionally responsive clutch means 21 which has an agitate clutch 22 adapted to be connected to sheave 19 and a spin clutch 23 adapted to be connected to sheave 14. When the drive motor is rotated in the agitate direction only clutch 22 is driven and motive power is supplied to gear train 15 to oscillate the agitator. The gear frame 8 is held against rotation in the direction of sheave 19 by a snubber or brake member 24 carried on casing 9 and engaging the sheave 14. When the motor is oppositely rotated only spin clutch 23 is driven and it drives the sheave 14 and its associated gear frame 8 is rotated to rotate basket 3. The snubber 24 is so constructed as to be ineffective to restrain rotation in the spin direction. Agitator 4 rotates idly with the basket. The direction responsive clutch mechanism and snubber and their operation above described are more particularly shown and described in the presently pending application of Jacob W. McNairy, Serial No. 164,427, filed May 26, 1950, for Drive Clutch for Washing Machines or the Like and owned by the General Electric Company, assignee of the present application.

The motor is directly coupled to a direction responsive pump 25, the inlet of which is connected to the bottom of the tube 2 to draw water from the tub and discharge it through any suitable conduit 26. The pump may be of the type described and claimed in the presently pending application of Carl R. Sebens, Serial No. 156,802, filed April 19, 1950, for Centrifugal Pump and owned by the General Electric Company, assignee of the present application. Such a pump produces a substantial positive pumping head when operated in one direction and a negative head for opposite rotations; when the motor 20 is rotating in the agitate direction the pump will generate a negative head and will not remove water from the tub.

Water is supplied from a suitable external source directly to the basket 3. Pursuant to conventional practice the washing machine contains solenoid operated valves 27, 28 intended respectively for connection to a cold water and a hot water source and feeding into a common spout 29 which reaches over the top of the basket to discharge thereinto, as shown in Figs. 1 and 2.

The several operations which collectively make up the entire washing operation are under the control of a motor driven program controller suitably mounted on the machine convenient to the operator. This program controller which we have generally identified by the reference character 30 in Fig. 3 may embody a cam bank and switch arrangement similar to that described and claimed in the Newell Patent 2,481,333, granted September 6, 1941, for Electric Switch Mechanism.

Such a switch has a suitably indexed dial 31, a plurality of cams 32, 33, 34, 35 and a timer motor 36. These cams, including the dial 31 (which also is a cam), are also designated by the numerals I, II, III, IV, and V, as shown in Fig. 3, for easier reference to the cam chart of Fig. 4. The respective cams and indicating dial are keyed on the motor driven shaft 37 and the mechanism is such that the dial 31 may be manually operated to advance the timing system to any selected operating position or, as is frequently desirable, to shorten any particular operation cycle.

In each of the cams of 32, 34 and 35, the high portions represent operative positions associated with spin drying and the low portions represent operative positions related to clothes washing. It will be noted that cams 34 and 35 may be identical, which effects a considerable economy. The circuit includes a manually operable double pole single throw switch 38 pursuant to which the operator may optionally use only hot water or a fixed mixture of hot and cold water for washing. Regardless of the wash water temperature selection, the fixed mixture will be supplied for rinsing because the cam follower on the periphery of dial 31 automatically will cause both poles of switch 38 to close after the first fill. The poles of said switch are designated 38a and 38b, respectively, and to choose the hot and cold mixture for washing, the operator merely closes the contact 38a manually, using a suitable lever, not shown, the upper arm of switch 38 being movable to closed position independently of the lower arm.

The circuit also includes a single pole double throw switch 40, of any conventional snap action type, having contacts 40a and 40b and which is arranged to be actuated by a lever 41 (Fig. 1) responsive to the level of water within tub 2. In the schematic circuit representation of Fig. 3, it is assumed that the lower contacts 40a are bridged when the tub is empty and that the upper contacts 40b are bridged when the water level reaches a predetermined maximum. Suitable means for operating such a switch are shown and described in the presently pending application of John Bochan, Serial No. 160,857, filed May 9, 1950, for a Pressure Responsive Control Switch for Washing Machines and the Like, and owned by the General Electric Company, assignee of the present invention.

Cams 32, 34, and 35 each operate single pole, double throw switches. The lower contacts of each switch carry the identification number of the cam with the subscript "A" (for agitate) and the upper contacts have subscripts "S" (for spin). Cam 33 operates a single pole single throw switch 33a. The circuit is connectable to a source of electrical energy, for example, 110 volts 60 cycle A. C., by a conventional plug P. The main leads of the circuit comprise the supply conductor 42 and the return conductor 43.

The impedance of timer motor 36 is made greater than that of the water valve solenoids 27, 28 and they, in turn, have an impedance greater than that of the drive motor 20. The several cams are in the position of Fig. 3 when the operator has rotated dial 31, which also causes rotation of shaft 37, from "off" position to "fill" position. This may be to any position within the space marked "Fill-Agitate," the position depending upon the agitating time desired. The switch actuator of cam 32 has dropped off the high portion of the cam; the switch actuator of cam 33 has entered onto the high portion of its cam; and the switch actuators of cams 34 and 35 have dropped off the high portions of their cams. The fact that the manually operable switch 38 is in the position shown with pole 38a open indicates that the operator has chosen to use hot water at line temperature for washing. The machine then begins to fill with hot water by reason of the following circuit: from the plug P through conductors 42, 44 to the bridged pole 32A of cam 32, conductors 45, 46 to hot water solenoid 28, conductors 47, 48 to the bridged "empty" position contacts 40a of water level responsive switch 40, conductors 50, 51 to the bridged contacts 33a of cam 33, conductors 52, 53 to the main winding 20b of motor 20 and through return conductor 43. Because the impedance of solenoid coil 28 is much higher than that of the drive motor, and the timer motor is in parallel with the drive motor, which, by the way, offers a parallel return path for the solenoid circuit just described, practically full line voltage is drawn across the coil 28 and water is admitted, but neither the timer motor nor the drive motor will start. Thus it will be seen that during the fill period the control cams are not turned. Had the operator chosen to use a mixture of hot and cold water for washing, pole 38a of switch 38 would have been closed manually before starting the machine, whereupon the branch circuit 54, 55 would have connected cold water solenoid 27 in parallel with the solenoid 28 across the conductors 45, 48.

Water is supplied to the basket 3 and soon overflows through holes 5 into tub 2. As the water rises therein to a predetermined level, switch 40 opens contacts 40a and closes contacts 40b, removing coil 28 from the circuit and thereby permitting the water valves to close. Timer motor 36 is energized through conductors 57, closed contacts 40b and conductors 50, 58. The main winding 20b of drive motor 20 is energized in a circuit including conductors 52 and 53 as before, and start winding 20a is energized in a circuit including conductors 52, 60, bridged contacts 34A, conductor 61, the normally closed centrifugal switch 20c, winding 20a, bridged contacts 35A and conductors 62, 63, to return conductor 43. Thus, the start and run windings of the drive motor are in parallel circuit relationship with the timer motor, and, consequently, when the coil 28 is removed from the circuit both motors are energized despite the difference in their relative impedances. The timer motor 36 begins to drive the program controlling cams in a counterclockwise direction and the drive motor begins oscillating the agitator 4 through clutch 22, sheave 19, shaft 18, gear train 15, and shaft 7. This is the beginning of the time responsive operations, as best illustrated by the cam chart of Fig. 4. The portion of the wash cycle labeled agitate in Fig. 4 includes both the fill and agitate space on the dial 31. Agitation begins in the manner explained above, as soon as the float valve closes the contacts 40b. The timer does not start driving the cams until after the initial fill. The agitation part of the wash cycle may include approximately one-third of the total space on the periphery of the cams, as shown on the cam chart, or considerable variations from this amount depending on the washing machine to which it is adapted and the amount of the selective time differences to be made available for the user. For example, the user may have a choice, when he first turns the dial 31, of washing times varying from five to twenty minutes.

When the drive motor has reached a predetermined speed, the centrifugal switch 20c opens, thereby removing the start winding from the circuit in the usual well-known manner.

Before the agitation cycle has been completed the cam follower riding on the periphery of the dial 31 enters onto the high portion, closing both poles of switch 38 to insure that a fixed mixture of cold and hot water is supplied to the basket for subsequent fills. The closing of this switch also provides an alternate path for power from conductor 42 to conductor 50 whenever the contacts 32A are opened and contacts 32S are closed. Because the pump 25 does not function as a pump when the motor 20 is turning in its agitate direction, the water collected in the tub 2 has not been removed and the water level responsive switch 40 still has its contacts 40b closed. Consequently, no water can be supplied to the basket at this point in the cycle.

As the timer continues to rotate the cams, the follower of cam 33, or III as shown on the cam chart, drops off the high portion of the cam, thereby opening the contacts of switch 33a. This interrupts the energizing circuit for the main winding 20b of the drive motor 20, thereby ending agitation as the motor and its driven mechanism coasts to a stop. This interruption permits switch 20c to again close.

During this pause period the timer motor 36 remains energized and continues to rotate the cams, and substantially simultaneously the cam followers for cams 35, 32, and 34 (I, II, and IV as seen on the cam chart) enter on the high portion of their respective cam peripheries, thereby opening the switch contacts 35A, 32A, and 34A and closing contacts 35S, 32S, and 34S. The timer remains energized, since the float switch contacts 40b remain closed, and the main winding 20b of the drive motor is not re-energized because the switch 33a remains open. The opening of contacts 34A and 35A and the closing of contacts 34S and 35S, however, connect the start winding 20a in the opposite direction from the connection previously described, but the start winding is not energized until switch 33a is closed.

When the time allotted for the short pause period is over, the cam follower riding on the periphery of cam 33, or III as shown in the chart, enters onto the high portion, thereby closing switch 33a. This completes the reversed connection circuit for the start winding, including conductors 42 and 64, closed contact 38b, conductors 65, 54, 46, and 57, the bridged contacts 40b, conductors 50 and 51, switch 33a, conductors 52, 53, and 66, the bridged contacts 35S, conductor 67, winding 20a, switch 20c, conductor 61, bridged contacts 34S, conductors 68 and 63, and return conductor 43. Also completed is a main winding circuit comprising conductors 42 and 64, closed contact 38b, conductors 65, 54, 46, and 57, the bridged contacts 40b, conductors 50 and 51, switch 33a, conductors 52 and 53, winding 20b, and return conductor 43. Completion of these circuits starts the motor in the opposite direction of rotation from agitate, and initiates the spin cycle. The basket is rotated through the clutch 23, the sheave 14, the shaft 12, the gear frame 8, and the shaft 6. The pump 25 is now driven in the direction in which it develops a positive pumping head, so that the water in the tub 2 is continually exhausted as the wash water is thrown out of the basket ports 5 by centrifugal action and into the tub. In a short time, the water level in the tub 2 will be below that necessary to maintain the switch contacts 40b bridged.

As the motor 20 comes up to speed, the centrifugal switch 20c opens, removing the start winding from the motor circuit.

At the same time the motor circuit described above is completed, an auxiliary circuit is completed through conductors 42 and 64, the bridged contacts 38b, conductors 65, 54, and 45, bridged conductors 32S and conductor 69 to the connection of conductors 50 and 51. This latter circuit connects with the reversed start circuit and main winding circuit just described and serves as the source of their energization after the switch contacts 40b are opened upon the exhaustion of water in the tub 2. This circuit also serves to shunt the circuit completed upon the closing of contacts 40a, also upon exhaustion of the water in the tub 2, and prevents the energization of the solenoids 27 and 28 which control the inlet water valves.

The spin portion of the cycle continues until the cam follower for cam 33 drops into its next depression. As best shown in Fig. 4, the cam 33, or III, is provided with a depression of about twice the peripheral length of its previous depression, which initiated the first pause period. The switch 33a is opened, interrupting the drive motor circuit. The timer motor is in series with the solenoids 27 and 28. Although switch 33a has interrupted the solenoid shunting circuit, the impedance of the timer is so much greater than that of the solenoid coils that they will not operate to initiate another fill operation. Filling the basket with water at the beginning of this coast period would be undesirable, since the peripheral speed of the basket is so great that the water spray from the nozzle 29 might cause tearing or fraying of the clothes.

Shortly after the beginning of the coast period, the centrifugal switch 20c closes and later during the coast period the cams 35, 32, and 34 (I, II, and IV as shown in Fig. 4) rotate to a point where the respective cam followers drop down upon low portions of the cam peripheries. Consequently, switch contacts 35S, 32S, and 34S are opened and contacts 35A, 32A, and 34A are closed. This prepares the circuits for the start winding 20a and the main winding 20b for the drive motor so that they will be energized upon the closing of switch 33a and the contacts 40b, by the same circuits as in the case of the earlier agitate period, with the start winding connections opposite to that described for the spin period. Although the contacts 40a are still closed, there being no water in the tub 2, the water valve solenoids do not operate because they are still in direct series relation with the timer motor.

The coast period ends when the cam follower for cam 33, or III as seen in Fig. 4, is elevated once again to a high portion of the cam periphery, thereby closing switch 33a. Both water valves are immediately opened to begin filling the basket 3 with a mixture of hot and cold water by reason of the following circuit: from the plug P through conductors 42, 64 to contact 38b, through conductor 65, and then alternately through either contact 38a, conductor 55 and cold water solenoid coil 27 or conductors 54, 46, hot water solenoid coil 28, and conductor 47, and then to conductor 48, contacts 40a, conductors 50, 51 to the bridged contacts 33a, conductors 52, 53 to the main winding 20b of motor 20 and through return conductor 43 back to plug P. It will be noted that, just as for the first fill period, the timer circuit offers a parallel return path for the water valves circuit just described, by conductors 50, 58, timer motor 36, and conductor 43 to the plug P. Consequently, the impedance of the water valve solenoids, being greater than that of the drive motor, is greater than the parallel circuit including the drive motor and the timer motor, and sufficient voltage drop across the solenoids is obtained to energize them, thereby opening the inlet water valves. Since the start winding 20a is in parallel relationship with the main winding 20b, its effect is merely to further lessen the impedance of the drive motor and timer motor circuit. Thus, the water valves are opened, but since practically full line voltage is drawn across the water valve solenoids, neither the drive motor nor the timer motor will operate. The cams will remain stationary, therefore, until the water in the outer tub 2 reaches a sufficient depth to actuate the switch 40, opening contacts 40a to remove the water valve solenoids from the circuit.

Upon the opening of contacts 40a of the water responsive valve 40, contacts 40b will be closed, thereby establishing the identical timer and drive motor circuits that were used at the end of the first fill and the beginning of the initial agitate operation. In addition, a circuit comprising conductors 42, 64, closed contact 38b, conductors 65, 54, 46, 57, bridged contacts 40b and conductor 50, is established to form an alternate supply path in parallel with that through bridged contacts 32A, so that the opening of 32A will interrupt neither the timer nor the drive motor operation.

The end of the second or rinse agitate period occurs when the cam follower for cam 33 falls to a low portion on the cam periphery (see the chart for cam III in Fig. 4), thereby opening the switch 33a and interrupting the drive motor circuit. The timer motor, of course, remains undisturbed. This initiates the second pause period, the coasting to a stop of the motor and mechanism being referred to as "pause" following agitation and "coast" following spinning.

The second or rinse spin operation is initiated in the same manner and using the same circuits as the initial or wash spin operation previously described. The only variation occurs at the end of this extraction period in that following the opening of switch 33a to deenergize the drive motor the switch 38 opens when the cam follower for the dial 31, or cam V as shown on the cam chart, falls into a low portion on its periphery. This permits the operator to choose whether hot wash water for the next washing, or a mixture of hot and cold, is desired.

It is apparent, of course, that upon moving the dial manually from the "off" position to the "fill" position, switch contacts 35A and 34A are closed, then switch 33a is closed, and finally contacts 32A are closed to prepare the circuits for another filling operation and wash agitate period to begin the washing of another clothes load.

While we have shown a particular embodiment of our invention, it will be understood, of course, that we do not wish to be limited thereto, since many modifications may be made; and we therefore contemplate by the appended claims to cover any such modifications as fall within the true spirit and scope of our invention.

What we claim as new and desire to secure by Letters Patent of the United States is:

1. In a clothes washing machine having an electric drive motor and electroresponsive liquid supply means, control means for said drive motor and said supply means comprising an electric timer motor, a plurality of rotatable cams driven by said timer motor, a drive motor circuit, a liquid supply means circuit, a timer motor circuit, switches in said circuits controlled by said cams, manually operable means for initially rotating said cams to actuate a plurality of said switches to establish a control circuit comprising said drive motor circuit and said timer motor circuit in parallel relation to each other and said liquid supply circuit in series relation thereto; the said liquid supply means circuit having electrical impedance substantially greater than the impedance of the parallel circuit branch comprising said drive and timer motor circuits whereby said liquid supply means only is operated upon the energization of said control circuit, and means for removing said liquid supply means circuit from said control circuit to effect operation of said drive motor to initiate washing and of said timer motor to initiate rotation of said cams.

2. In a clothes washing machine having an electric drive motor and electroresponsive water supply means; control means comprising an electric timer motor, a drive motor circuit, a timer motor circuit in parallel relation with said drive motor circuit, and a water supply circuit in series relation with said drive and timer motor circuits, the impedance of said water supply circuit being greater than the impedance of said drive and timer motor circuits in parallel so that said water supply means only is operated upon the energization of said circuits, and water responsive switch means for interrupting said water supply circuit and establishing an alternative circuit to said drive and timer motor circuits to operate said drive motor and said timer motor.

3. In a clothes washing machine having a driving motor and electroresponsive liquid supply means, control means for said motor and said supply means comprising a timer motor, a plurality of cams rotatably driven by said timer motor, switch means operated by said cams, manually operable means for rotating said cams to operate said switch means, a circuit closed by said cam-operated switch means comprising said drive motor and said timer motor in parallel relationship and said liquid supply means in series relationship therewith, the impedance of said liquid supply means being substantially greater than the impedance of the parallel circuit branch including said timer and driving motors so that substantially the full line voltage is drawn across said liquid supply means, and switch means responsive to an accumulation of liquid in the clothes washing machine for interrupting said liquid supply circuit and establishing a shunt circuit to said timer and driving motor parallel circuit to operate said timer motor and said driving motor.

4. In a clothes washing machine having a clothes basket with washing means therein, a liquid collecting tub substantially surrounding said basket, an electric drive motor for said basket and said washing means, and electroresponsive liquid supply means for said basket, control means comprising an electric timer motor, a cam drum driven by said timer motor, switch means operated upon initial manual rotation of said cam drum to effect a circuit comprising said drive motor and said timer motor in parallel relationship and said liquid supply means in series relationship therewith, the impedance of said liquid supply means being substantially greater than the impedance of the parallel circuit branch including said drive and timer motors so that substantially the full line voltage is drawn across said liquid supply means to operate said means, and a switch located in said tub responsive to the depth of liquid accumulated therein during operation of said water supply means for interrupting said supply and for establishing an alternate circuit branch in series with said drive and timer motor circuit branch to initiate operation of said motors.

5. In a clothes washing machine, having a spin basket, washing means in the basket, an electric drive motor for driving selectively said basket and said washing means, and electroresponsive liquid supply means for said basket, the impedance of said liquid supply means being substantially greater than the impedance of said drive motor, control means comprising an electric timer motor the impedance of which is substantially greater than the impedance of said liquid supply means, a plurality of cams driven by said timer motor, switch means operated by said cams, an electric circuit effected by said switch means upon rotation of said cams comprising a first branch including in parallel said liquid supply means and a low impedance conductor, a second branch including in parallel said drive and timing motors, means connecting said branch circuits in series, means effected by said switch means for interrupting the circuit through said drive motor and the circuit through said low impedance conductor to place said liquid supply means directly in series with said timer motor whereby said timer motor only is operated, and means effected by said switch means for re-establishing a circuit through said drive motor in parallel circuit relation with the circuit through said timer motor whereby said liquid supply means only is operated.

6. In a clothes washing machine, having a spin basket, washing means in the basket, an electric drive motor for driving selectively said basket and said washing means, and electroresponsive liquid supply means for said basket, the impedance of said liquid supply means being substantially greater than the impedance of said drive motor, control means comprising an electric timer motor the impedance of which is substantially greater than the impedance of said liquid supply means, a plurality of cams driven by said timer motor, switch means operated by said cams, an electric circuit effected by said switch means upon rotation of said cams comprising a first branch including in parallel said liquid supply means and a low impedance conductor, a second branch including in parallel said drive and timing motors, means connecting said branch circuits in series, means effected by said switch means for interrupting the circuit through said drive motor and said low impedance conductor to place said liquid supply means directly in series with said timer motor whereby said timer motor only is operated, means effected by said switch means for re-establishing said drive motor circuit in parallel circuit relation with said timer motor circuit whereby said liquid supply means only is operated, and means independent of said timer driven cams for interrupting the circuit through said liquid supply means and establishing in place thereof a relatively low impedance conductor in series with said drive and timer motor branch circuit whereby said drive and timer motors are operated.

7. In a clothes washing machine having an electric drive motor, an electroresponsive hot water supply valve, and an electroresponsive cold water supply valve; control means comprising an electric motor driven timer, a drive motor circuit and a timer motor circuit in parallel, a hot water valve circuit and a cold water valve circuit in parallel, means actuated by said timer for connecting the parallel drive motor and timer motor circuits in series with the parallel hot water and cold water circuits, manually operable means including a water temperature selector switch for completing said cold water valve circuit, automatic means for interrupting said parallel circuits including said valves and establishing in place thereof a low impedance circuit in series with said motor circuits, and means including switch means associated with said water temperature selection switch automatically operable by said timer to complete an alternate low impedance circuit in series with said motor circuits.

8. In a clothes washing machine having an electric drive motor for performing washing operations and electrically operated valve means for supplying water to the machine, the impedance of said electrically operated valve means being substantially greater than the impedance of said drive motor, a control means comprising a drive motor circuit, a valve operating circuit, a timer, and electric switches operated by the timer for connecting said drive motor circuit and said valve operating circuit in series to effect operation of said valve means to supply water to the machine, the drive motor remaining stationary due to its low impedance compared to that of said electrically operated valve means, and switch means which is actuated after a predetermined amount of water has been supplied to the machine for opening the valve operating circuit and closing the drive motor circuit to effect the performance of a washing operation.

9. In a clothes washing machine having an electric drive motor for performing washing operations, a water supply valve and electromagnetic means for operating the supply valve, the impedance of said electromagnetic means being substantially greater than the impedance of said drive motor, control means for said drive motor and said electromagnetic means comprising a timer motor having an impedance substantially higher than that of said electromagnetic means, an electromagnetic means circuit, a drive motor circuit, a timer motor circuit, switch means actuated by the timer motor for connecting the timer motor circuit and the drive motor circuit in parallel with each other and in series with the electromagnetic means circuit to effect opening of said supply valve, the relative impedance values of the drive motor, the electromagnetic means and the timer motor being such that the drive motor and the timer motor will not be operated, and switch means actuated by the timer motor for opening the drive motor circuit and connecting the electromagnetic means and the timer motor in series, the relative impedance of the electromagnetic means and the timer motor being such that the timer motor is operated but the water valve is not operated for performing a step in the washing cycle.

10. In an automatic washing machine, mechanism for performing washing operations, a valve for supplying water to the machine, a drive motor for operating said mechanism, electromagnetic means for operating said valve, a timer motor, said drive motor, timer motor and electromagnetic means having relative impedances such that when the electromagnetic means is connected in series circuit with parallel circuits through the drive motor and the timer motor only the electromagnetic means is operated and when the electromagnetic means is connected in series circuit with the timer motor only the timer motor is operated, and means including switches operated by the timer motor for effecting such circuit connections during automatic operation of the washing machine.

11. In an automatic washing machine, mechanism for performing washing operations, a valve for supplying water to the machine, a drive motor for operating said mechanism, electromagnetic means for operating said valve, a timer motor, said drive motor, timer motor and electromagnetic means having relative impedances such that when the electromagnetic means is connected in series circuit with parallel circuits through the drive motor and the timer motor only the electromagnetic means is operated and when the electromagnetic means is connected in series circuit with the timer motor only the timer motor is operated, and means including a switch operated in response to the amount of water in the washing machine and switches operated by the timer motor for effecting such circuit connections during automatic operation of the washing machine.

12. In an automatic washing machine, mechanism for performing washing operations, a valve for supplying water to the machine, a drive motor for operating said mechanism, electromagnetic means for operating said valve, a timer motor, said drive motor, timer motor and electromagnetic means having relative impedances such that when the electromagnetic means is connected in series circuit with parallel circuits through the drive motor and the timer motor only the electromagnetic means is operated and when the electromagnetic means is connected in series circuit with the timer motor only the timer motor is operated, and means including a timer motor operated switch in the drive motor circuit for effecting such circuit connections during automatic operation of the washing machine whereby by opening such switch the drive motor circuit may be opened and the timer motor continued in operation without effecting operation of said electromagnetic means to admit water to the machine.

STANLEY B. WELCH.
EUGENE G. OLTHUIS.

References Cited in the file of this patent
UNITED STATES PATENTS

| Number | Name | Date |
|---|---|---|
| 2,391,561 | Geldhof | Dec. 25, 1945 |
| 2,526,444 | Woodson | Oct. 17, 1950 |
| 2,561,257 | Woodson | July 17, 1951 |
| 2,579,598 | Morrison | Dec. 25, 1951 |